United States Patent [19]
Yamaguchi

[11] Patent Number: 5,734,889
[45] Date of Patent: Mar. 31, 1998

[54] METHOD AND APPARATUS FOR RETRIEVING DATA AND INPUTTING RETRIEVED DATA TO SPREADSHEET INCLUDING DESCRIPTIVE SENTENCE INPUT MEANS AND NATURAL LANGUAGE INTERFACE MEANS

[75] Inventor: Tomoharu Yamaguchi, Tokyo, Japan

[73] Assignee: NEC Corporation, Tokyo, Japan

[21] Appl. No.: 588,280

[22] Filed: Jan. 18, 1996

Related U.S. Application Data

[63] Continuation of Ser. No. 280,947, Jul. 27, 1994, abandoned.

[30] Foreign Application Priority Data

Jul. 29, 1993 [JP] Japan ................... 5-188292

[51] Int. Cl.$^6$ ..................................... G06F 17/30
[52] U.S. Cl. ................ 395/604; 395/759; 395/764; 395/769
[58] Field of Search ................... 395/601, 603, 395/604, 751, 759, 768, 769, 764

[56] References Cited

U.S. PATENT DOCUMENTS

| | | | |
|---|---|---|---|
| 4,885,694 | 12/1989 | Pray et al. | 395/155 |
| 5,038,316 | 8/1991 | Hempleman et al. | 395/275 |
| 5,303,375 | 4/1994 | Collins et al. | 395/650 |

FOREIGN PATENT DOCUMENTS

| | | |
|---|---|---|
| 430254 | 2/1992 | Japan . |
| 4220767 | 8/1992 | Japan . |
| 554067 | 3/1993 | Japan . |
| 554078 | 3/1993 | Japan . |
| 6195392 | 7/1994 | Japan . |

OTHER PUBLICATIONS

Obermeier "The NLQ Approach to Database Retrieval" Proc. IEEE NAECON '89, pp. 1370–1373, 1989.

Tseng et al "Extending the E–R Concepts to Capture Natural Language Semantics for Database Access" Proc. IEEE Compsac '91, pp. 30–35, 1991.

Uthurusamy et al "Extracting Knowledge from Diagnostic Databases" IEEE Expert. vol. 8, No. 6, pp. 27–38, Dec. 1993.

P. Cobb et al. Running Microsoft Excel Microsoft Press, pp. 673–674, 1988.

Proceedings of the 43rd National Meeting of the Information Processing Society of Japan, vol. 3, pp. 175–176, Oct. 1991.

Morgan, B. "Occam's Muse." DBMS, vol. 5, No. 6, pp. 28, Jun. 1992.

*Primary Examiner*—Thomas G. Black
*Assistant Examiner*—Jack M. Choules
*Attorney, Agent, or Firm*—Whitham, Curtis, Whitham & McGinn

[57] ABSTRACT

A method and apparatus for retrieving data on a database and inputting the retrieved data to an electronic spreadsheet so as to record the data thereon includes inputting, through an input apparatus by a natural language, a descriptive sentence relating to the data to be recorded in the spreadsheet. The input descriptive sentence is processed by a natural language interface to generate a retrieval formula for retrieval on the database. A retrieval result extractor executes data retrieval on the database by the retrieval formula, eliminates unnecessary accompanying data from results of the retrieval, and inputs the thus obtained table data to the spreadsheet so as to record the data therein.

14 Claims, 14 Drawing Sheets

FIG. 2

| COMPANY | ADDRESS | TEL | FAX |
|---|---|---|---|
| | | | |
| | | | |
| | | | |

FIG. 3

| COMPANY | | | |
|---|---|---|---|
| SALES | | | |
| EARNINGS | | | |
| CAPITAL | | | |

FIG. 4

| | SALES | PROFIT | DEBT |
|---|---|---|---|
| 1ST HALF YEAR | | | |
| 2ND HALF YEAR | | | |
| ANNUAL | | | |

FIG. 5

|  |  | SALES | EARNINGS | DEBT |
|---|---|---|---|---|
| THIS YEAR | 1ST HALF YEAR |  |  |  |
|  | 2ND HALF YEAR |  |  |  |
|  | ANNUAL |  |  |  |
| LAST YEAR | 1ST HALF YEAR |  |  |  |
|  | 2ND HALF YEAR |  |  |  |
|  | ANNUAL |  |  |  |

FIG. 6

| COMPANY NAME | COMPANY ADDRESS | TEL NO. | FAX NO. | SALES | ----- |
|---|---|---|---|---|---|
| A Industry | Xcho,Mcity | 12-1234 | ----- | ----- |  |
| L Industry | Ucho,Lcity | 34-5678 |  |  |  |
| B Corporation | Ycho,Mcity | 12-3456 |  |  |  |
| C firm | Zcho,Mcity | 12-7890 |  |  |  |
| ----- | ----- | ----- |  |  |  |

FIG. 7

(a)
```
THERE ARE THREE.
COMPANY NAME ;    COMPANY ADDRESS;
A INDUSTRY    ;   Xcho,Mcity         ;
B CORPORATION;    Ycho,Mcity         ;
C FIRM        ;   Zcho,Mcity
```
~9

(b)
```
COMPANY NAME :    COMPANY ADDRESS:
A INDUSTRY    :   Xcho,Mcity         :
B CORPORATION:    Ycho,Mcity         :
C FIRM        :   Zcho,Mcity         :
```
~6

(c)

| COMPANY NAME  | COMPANY ADDRESS |
|---------------|-----------------|
| A INDUSTRY    | Xcho,Mcity      |
| B CORPORATION | Ycho,Mcity      |
| C FIRM        | Zcho,Mcity      |

F I G. 13

```
DESCRIPTIVE SENTENCE: ="RETRIEVE" <RETRIEVAL CONTENT>
<RETRIEVAL CONTENT>: =<OBJECT> <CONDITION>
    <OBJECT>        :=[<TITLE NAME>"AND"]*<TITLE NAME>
    <CONDITION>     :="FOR"[<TITLE NAME>"AND"]*<TITLE NAME>
    <TITLE NAME>    :=<TITLE NAME>"OF"<UPPER TITLE NAME>|<LOWEST TITLE NAME>
```

FIG. 14

RETRIEVE COMPANY NAME AND ADDRESS AND TEL. AND FAX.

FIG. 15

RETRIEVE SALES AND PROFIT AND DEBT FOR 1ST HALF YEAR AND 2ND HALF YEAR AND ANNUAL.

FIG. 16

RETRIEVE PROFIT FOR 2ND HALF YEAR.

FIG. 17

RETRIEVE SALES AND PROFIT AND DEBT FOR 1ST HALF YEAR OF THIS YEAR AND 2ND HALF YEAR OF THIS YEAR AND ANNUAL OF THIS YEAR AND 1ST HALF YEAR OF LAST YEAR AND 2ND HALF YEAR OF LAST YEAR AND ANNUAL OF LAST YEAR.

METHOD AND APPARATUS FOR RETRIEVING DATA AND INPUTTING RETRIEVED DATA TO SPREADSHEET INCLUDING DESCRIPTIVE SENTENCE INPUT MEANS AND NATURAL LANGUAGE INTERFACE MEANS

This is a Continuation of Application Ser. No. 08/280,947 filed Jul. 27, 1994 now abandoned.

BACKGROUND OF THE INVENTION

The present invention relates to a data retrieving device for retrieving a set of data and inputting the retrieved data to a spreadsheet and a data retrieving method for the same, and particularly to a data retrieving device for retrieving a set of data on a database and inputting the retrieved data to an electronic spreadsheet for recording the data in a tabulated form, exemplarily to make a tabulated total, and a data retrieving method for the same.

DESCRIPTION OF THE RELATED ART

A conventional method for utilizing a lot of data constituted as a database includes a step of inputting a set of desired data from the database to a spreadsheet, before the utilization. In general, the inputting step of data directly reads a file of database that is stored with the data, to input it to the spreadsheet.

Another conventional method includes a step of retrieving necessary data from a database, to input them to a table. For the retrieval, there is input a programmed retrieval formula for the database.

The former conventional method, in which a file of database is directly read, needs the constitution of database to be understood, as well as the format of the file stored with data, and the like. The format of any table to be read is thus restricted by the storing format of database, constituting a difficulty in a selective reading of data. In most cases, the format of data retrieved to be extracted from a database does not have a sufficient adaptability to the table format of an employed spreadsheet, thus requiring the user to re-form the table format of read data into an adaptive one.

The latter conventional method, in which a retrieval formula is input for database retrieval, also needs the constitution of the database to be understood, in addition to the necessary preparation of retrieval formula by the user, who is thus required to master both how to write the formula for database retrieval and how to use a given spreadsheet.

In either conventional method, any user must be familiar with details of the constitution of the database to effectively utilize data therefrom on a spreadsheet. Such a requirement puts a large burden on the user to make an effective use of the database on a spreadsheet, exemplarily to obtain a tabulated total, thus constituting a hindrance to the application of the database to be wide and to the spread of related apparatus.

SUMMARY OF THE INVENTION

It is therefore an object of the present invention to provide a data retrieving device for retrieving a set of data on a database and inputting the retrieved data to an electronic spreadsheet, with an increased facility, and a data retrieving method for the same.

To achieve the object, the present invention provides a data retrieving device for retrieving a set of data on a database and inputting the retrieved data to an electronic spreadsheet having a table means for recording the data in a tabulated form, comprising: a descriptive sentence input means for inputting by a natural language a descriptive sentence relating to the data to be recorded in the table means; a natural language interface means for converting the input descriptive sentence into a retrieval formula for retrieving the data on the database; and a retrieval result extraction means for executing the retrieval on the database by the retrieval formula and recording the result of retrieval in the table means.

According to an aspect of the present invention, the table means includes a predetermined title section having one or more recorded titles corresponding to the data to be recorded in the table means and, preferably, the data retrieving device may: further comprise a descriptive sentence generation means for generating a descriptive sentence relating to the data by inputting the recorded title or titles and by combining the input titles; and input the descriptive sentence generated by the descriptive sentence generation means to the natural language interface means.

According to another aspect of the present invention, the data retrieving device may preferably: further comprise a descriptive sentence record means for recording one or more descriptive sentences corresponding to a set of data recorded in the table means, and a descriptive sentence synthesization means for generating a synthetic descriptive sentence by inputting the descriptive sentence or sentences recorded in the descriptive sentence record means and by combining the input sentences; and input the synthetic descriptive sentence generated by the descriptive sentence synthesization means to the natural language interface means.

Moreover, to achieve the aforementioned object, the present invention provides a data retrieving method for retrieving a set of data on a database and inputting the retrieved data to an electronic spreadsheet having a formatted table for recording the data, comprising: a descriptive sentence acquisition process for acquiring by a natural language a descriptive sentence relating to the data to be recorded in the table; a natural language interface process for converting the acquired descriptive sentence into a retrieval formula for retrieving the data on the database; and a retrieval result extraction process for executing the retrieval on the database by the retrieval formula and recording the result of retrieval in the table.

According to still another aspect of the present invention, the descriptive sentence acquisition process may preferably comprise: a title information reading process for reading title information recorded in a title section provided in the table; and a descriptive sentence generation process for generating a descriptive sentence relating to the data from the read title information.

According to yet another aspect of the present invention, the descriptive sentence acquisition process may preferably comprise: a descriptive sentence record process for temporarily storing a plurality of descriptive sentences; and a descriptive sentence synthesization process for reading the stored descriptive sentences and synthesizing them to generate a single descriptive sentence.

According to the present invention, a descriptive sentence relating to a set of data to be recorded is input by a natural language and converted into a retrieval formula as an imperative expression comprehensible to a database, the retrieval formula is applied to a data retrieval on the database, and the result of the retrieval is recorded, thus permitting an automatic data retrieval on a database with a simply input sentence by a natural language.

3

BRIEF DESCRIPTION OF THE DRAWINGS

The objects, features and advantages of the present invention, including those other than above-described, will become clear or more apparent by considering the following detailed description of preferred embodiments of the invention, in conjunction with the accompanying drawings, in which:

FIG. 2 is an illustrative example of a formatted table with a title section for columns;

FIG. 3 is an illustrative example of a formatted table with a title section for rows;

FIG. 4 is an illustrative example of a formatted table with both title sections for columns and for rows;

FIG. 5 is an illustrative example of a formatted table with a layered title section;

FIG. 6 is an illustrative partial image of the constitution of a database including exemplary data;

FIG. 7 is an illustrative flow chart of procedures for recording a set of retrieved data from a database to a spreadsheet, in which FIG. 7(a) shows a set of retrieved exemplary data, FIG. 7(b) a volume of extracted exemplary data, and FIG. 7(c) a set of recorded exemplary data in a table means;

FIG. 13 is an exemplary illustration of a generation rule for generating a descriptive sentence from title names;

FIG. 14 is an exemplary illustration of a descriptive sentence for a formatted table with a title section for columns;

FIG. 15 is an exemplary illustration of a descriptive sentence for a formatted table with both title sections for columns and rows;

FIG. 16 is an exemplary illustration of a descriptive sentence for a database retrieval concerning a particular region in a given table;

FIG. 17 is an exemplary illustration of a descriptive sentence for a formatted table with a layered title section;

DESCRIPTION OF THE PREFERRED EMBODIMENTS

There will be detailed hereinbelow a number of preferred embodiments of the data retrieving device and data retrieving method according to the present invention, with reference to the accompanying drawings, FIGS. 1 to 20, illustrating the embodiments.

Figure 1:
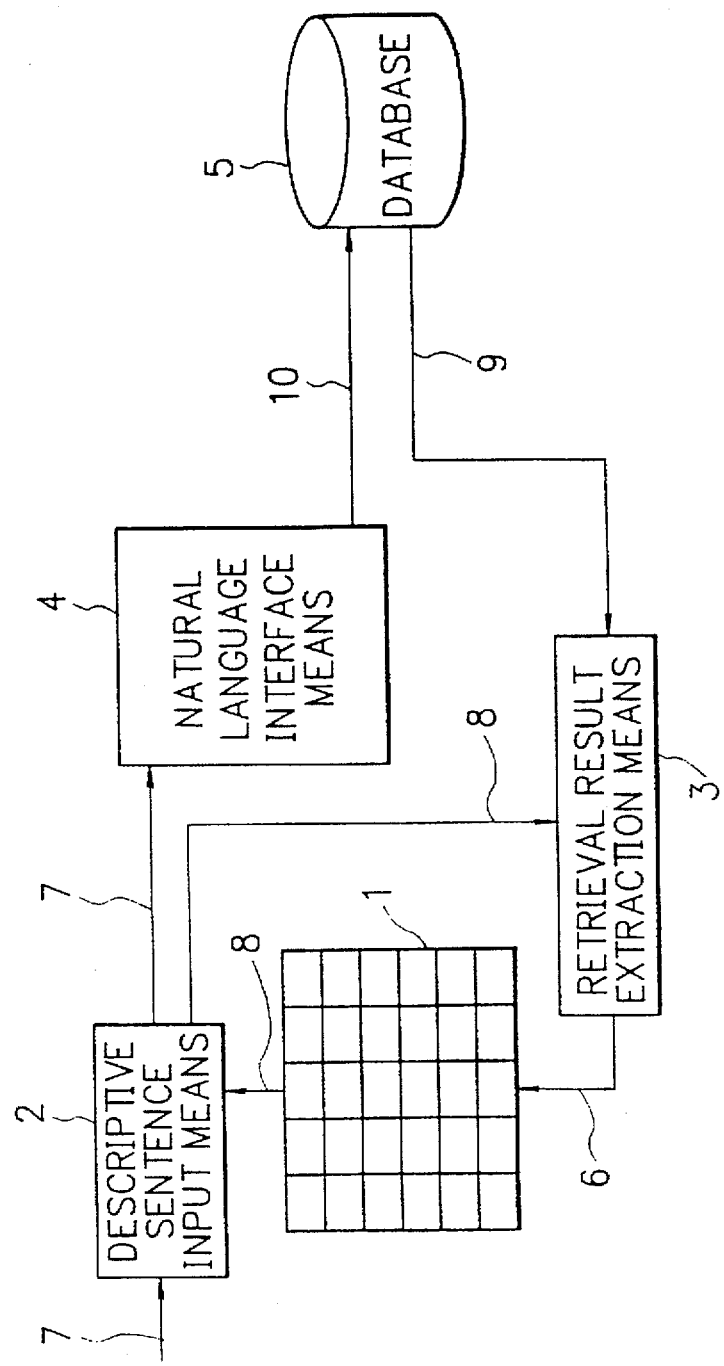
FIG. 1 is a functional block diagram of a data retrieving device according to a first embodiment of the present invention.

FIGS. 1 to 10 are for description of a first embodiment of the invention. FIG. 1 shows a functional block diagram of a data retrieving device according to the first embodiment, which comprises a table means 1, a descriptive sentence input means 2, a retrieval result extraction means 3, a natural language interface means 4 and a database 5.

Table means 1 is a software or hardware as a component device of an electronic spreadsheet. Table means 1 has a set of data recorded or stored therein, including varieties of table data 6 constituted in a tabulated form, to be visualized as corresponding tables to permit a facilitated recognition by users. FIGS. 2 to 5 illustrate typical examples of such tables. The tables are respectively formatted with their frames as combinations of rule lines selected for an easy grasp of associated data, in accordance with kind, quantity and content of the data. FIG. 2 exemplifies an adapted table format such as for a company address tabulation, FIG. 3 for a business result tabulation of companies, and FIG. 4 for a business result analysis of a company. FIG. 5 shows a variation of the example of FIG. 4. FIG. 6 gives a partial image of exemplary data stored in database 5 on which table data 6 are retrieved to be extracted.

Descriptive sentence input means 2 functions as an operation member for the user to input a descriptive sentence 7 by a natural language, and as a means for reading address (location on spreadsheet) information 8, such as on the location for record in the table, from table means 1 and inputting read information 8 to retrieval result extraction means 3. Input descriptive sentence 7 to the operation member is input therefrom to natural language interface means 4. Descriptive sentence 7 may be a retrieval formula as an imperative expression for a desired data retrieval on database 5. The term "natural language" is employed as a generic term for commonly used languages by users, and as opposed to various artificial languages such as for programming or machines.

Descriptive sentence 7 is exemplarily given as a definite one relating to a particular table, to execute a series of illustrated procedures in FIGS. 7(a), 7(b) and 7(c) for a case in which database 5 includes information on both names and addresses of companies. Table-related descriptive sentence 7 is input as a wording of "NAME AND ADDRESS OF COMPANIES IN CITY M". It gives a retrieval result 9 illustrated in FIG. 7(a). Retrieval result 9 is processed to eliminate a headline thereof "THERE ARE THREE." and convert semicolons therein to colons, to thereby obtain a group of exemplary table data 6 illustrated in FIG. 7(b). Table data 6 enter table means 1, which recognizes the colons as punctuation marks and tabulates data 6 to obtain a table illustrated in FIG. 7(c).

Figure 8:
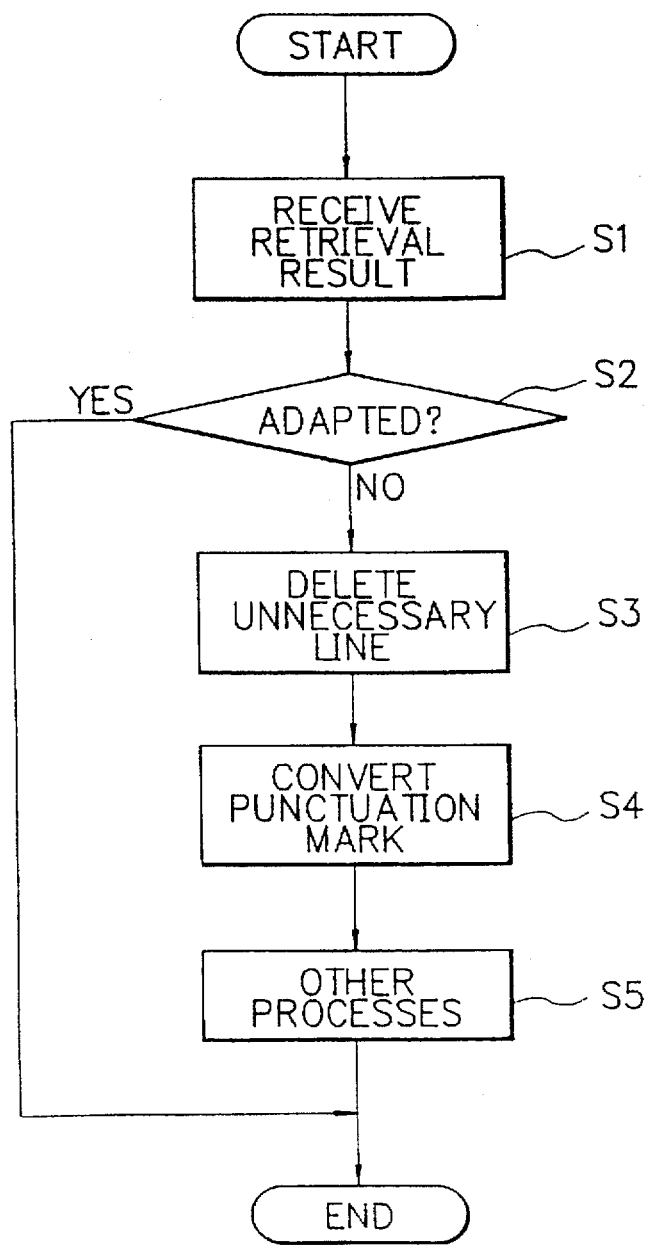
FIG. 8 is a flow chart for illustrating essential functions of a retrieval result extracting means.

Retrieval result extraction means 3 functions as a software, circuitry or device for receiving a set of retrieved data from database 5, reforming or reshaping retrieval result 9 to have table data 6 in a rearranged form, and outputting table data 10 to table means 1. FIG. 8 illustrates the function of retrieval result extraction means 3, as a flow chart of essential steps.

As shown in the flow chart of FIG. 8, retrieval result extraction means 3 receives retrieval result 9 output from database 5, at a step S1 thereof. Received retrieval result 9 is judged, at a step S2, whether it is adapted to table means 1 or not. If the judgment is negative, or in other words if retrieval result 9 includes additionally retrieved information, such as the number of extracted data, other than desired to record in table means 1, then such undesired information is eliminated at a step S3. In the case retrieval result 9 includes other punctuation marks than table means 1 can recognize, they are converted to be recognizable, at a step S4. At a step S5, other necessary processes are executed to obtain a desired form, to render complete the process function of retrieval result extraction means 3. If the judgment at step S2 is affirmative, the flow goes to the end without executing the processes at steps S3 to S5.

Natural language interface means 4 functions as a software, circuitry or device for inputting descriptive sentence 7 by a natural language, exemplarily by the Japanese, and generating a retrieval formula 10 for a data retrieval on database 5. It may preferably be constituted by employing a natural language interface method proposed in Japanese, Patent Application No. 4-256660 which the present applicant has filed.

Figure 9:
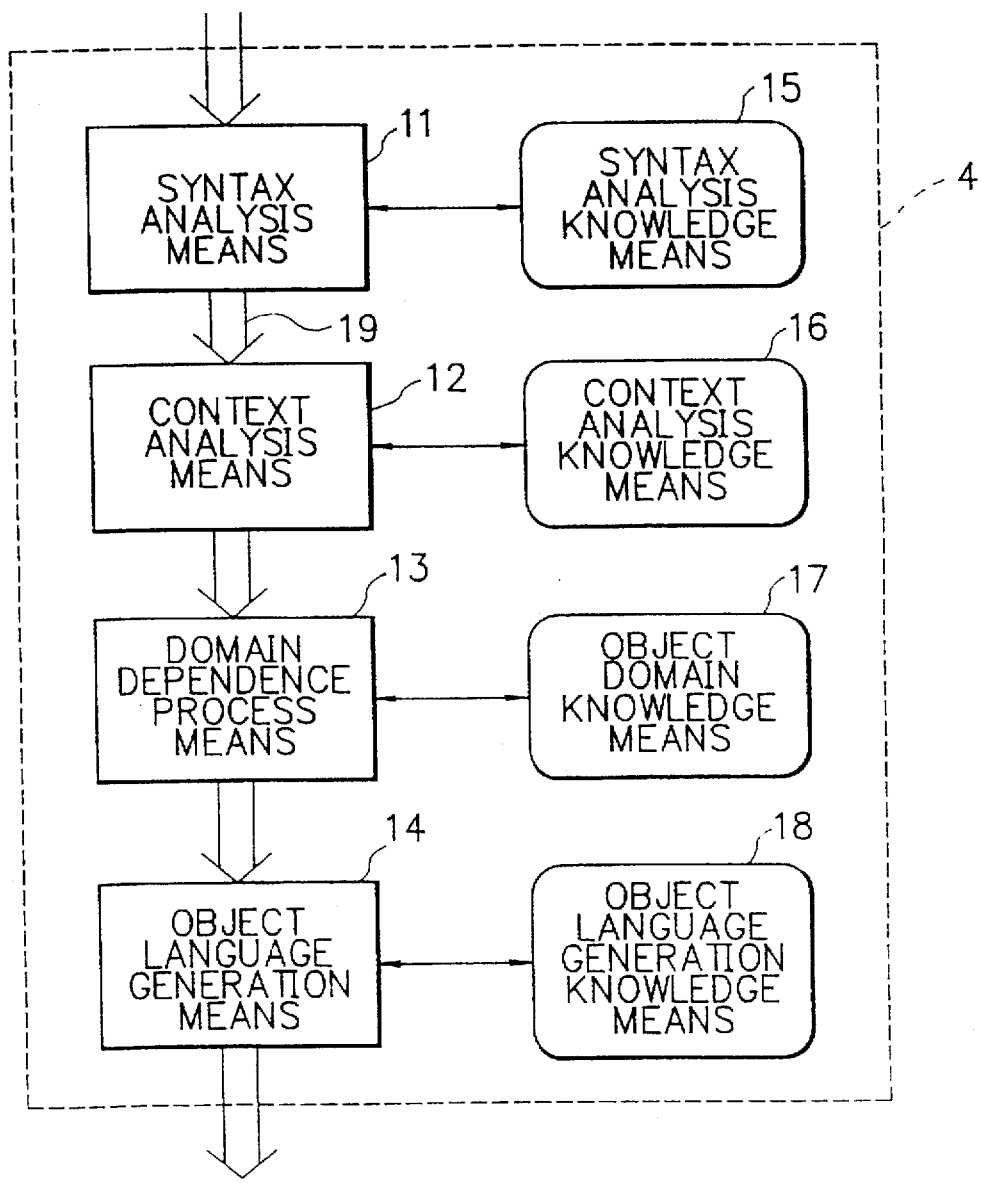
FIG. 9 is an exemplary constitutional block diagram of a natural language interface means.

FIG. 9 gives a conceptional constitution of natural language interface means 4, as a detailed example in the form of a functional block diagram. Interface means 4 includes a syntax analysis means 11, a context analysis means 12, a domain dependent process means 13 and an object language generation means 14 having employed a syntax analysis knowledge means 15, a context analysis knowledge means 16, an object domain knowledge means 17 and an object language generation knowledge means 18, respectively. Syntax analysis means 11 has an output thereof input to context analysis means 12, analysis means 12 to domain dependent process means 13, and process means 13 to object language generation means 14.

Syntax analysis means 11 functions as a processor for outputting a concept dependent expression 19 according to an input sentence by a natural language. Concept dependent expression 19 has the form of an elliptical sentence including a demonstrative part of speech such as the pronoun "that" or input with a definitive word omitting the content. Syntax analysis means 11 may preferably be constituted by employing a syntax analysis system proposed in Japanese Patent Application No. 2-135270.

Context analysis means 12 functions as a processor such as for determining the object of a demonstrative part in concept dependent expression 19 as well as for a supplement of omission in dependence on context. Context analysis means 12 may preferably be constituted by employing a context analysis system proposed in Japanese Patent Application No. 2-404767.

Domain dependent process means 13 functions as a processor for correlating a concept in concept dependent expression 19 with the meaning to be defined in an object domain, to thereby determine the task to be executed in an application system. In the case of a database working as the application system, an input sentence with an exemplary wording of "WANT TO KNOW NAME" has its concept "WANT TO KNOW" processed to determine an effective task "RETRIEVE" on the database. The remaining "NAME" is correlated to an appropriate meaning depending on an associated object domain, such as "PERSONAL NAME" or "COMPANY NAME" when the object domain refers to a definition of person or company, respectively. Domain dependent process means 13 may preferably be constituted by employing a meaning analysis system proposed in Japanese Patent Application No. 3-237023.

Object language generation means 14 functions as a processor for converting the determined task in domain dependent process means to an object language. There may preferably be employed a database retrieval device proposed in Japanese Patent Application No. 3-235453, to achieve an effective conversion process for database retrieval languages.

A dependency to object domain is provided in object domain knowledge means 17, as well as in the action of domain dependent process means 13. Other knowledge means 15, 16 and 18 have no dependency to object domain, like respective actions of syntax analysis means 11, context analysis means 12 and object language generation means 14.

Letting database 5 be an RDB (relational database) adapted to accept the SQL (structured query language), natural language interface means 4 generates retrieval formula 10 written in SQL. The generation of retrieval formula 10 may preferably be performed according to a retrieval formula generation method reported in the Proceedings of the 43rd National Meeting of the Information Processing Society of Japan, Vol. 3, pp. 175–176 Oct. 19, 1991 to Oct. 22, 1991. SQL is a standard operational language for RDB's, spread as a retrieval language on related databases.

Database 5 comprises a multipurpose file integratedly constituted with a lot of mutually correlated data, and may be structured in a variety of forms. In the present embodiment, database 5 includes information on company as exemplarily illustrated in FIG. 6 in a definite form. The retrieval of particular data on database 5 having such a structure is effected by retrieval formula 10 or the imperative expression for retrieval.

Figure 10:
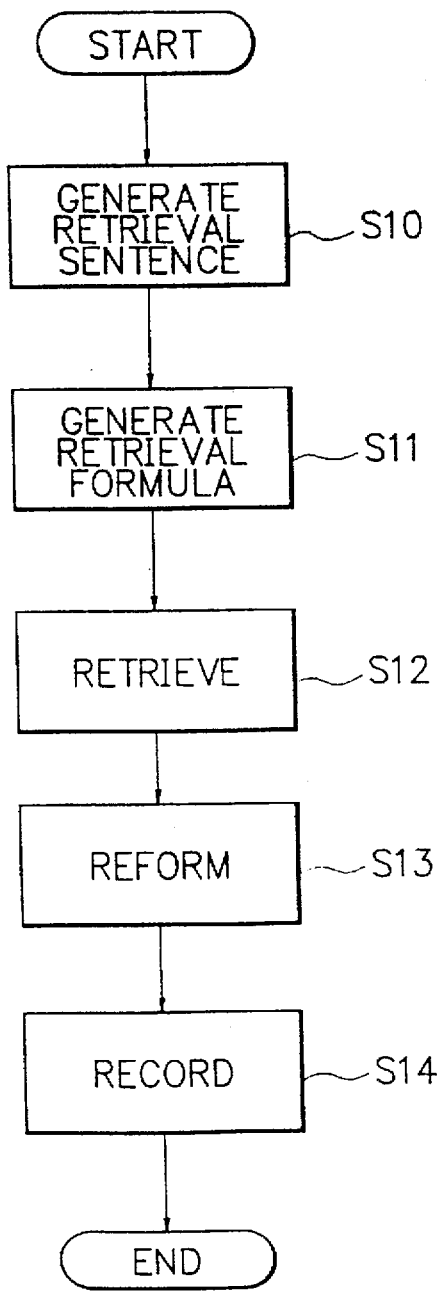
FIG. 10 is a flow chart for illustrating a series of essential functions in the first, a second and a third embodiment of the present invention, respectively.

There will be described hereinbelow a data retrieving method in use of the data retrieving device, constituted as described, according to the first embodiment of the invention, with reference to FIG. 10 showing a flow chart of essential steps in the method.

At a first step S10, it is required for a user to perform a retrieval sentence generation process by preparing descriptive sentence 7 in natural language in respect of desired data to be recorded in table means 1. The retrieval sentence generation process of step S10 includes a descriptive sentence input or acquisition process in which input means 2 is employed to input or acquire descriptive sentence 7. According to descriptive sentence 7 as the retrieval sentence generated at step S10, retrieval formula 10 is generated at a step S11 by natural language interface means 4, for a data retrieval on database 5. Retrieval expression 10 generated by natural language interface means 4 is applied to effect the retrieval on database 5 at a step S12, thereby retrieving a set of data. Retrieved data at step S12 are input to retrieval result extraction means 3, at a step S13, where they are reformed in the manner described with reference to FIG. 8. Following completion of process at step S13, retrieval result 9 is recorded in table means 1 at a step S14.

The data retrieving method according to the present embodiment has a complete form with steps S10 to S14.

Figure 11:
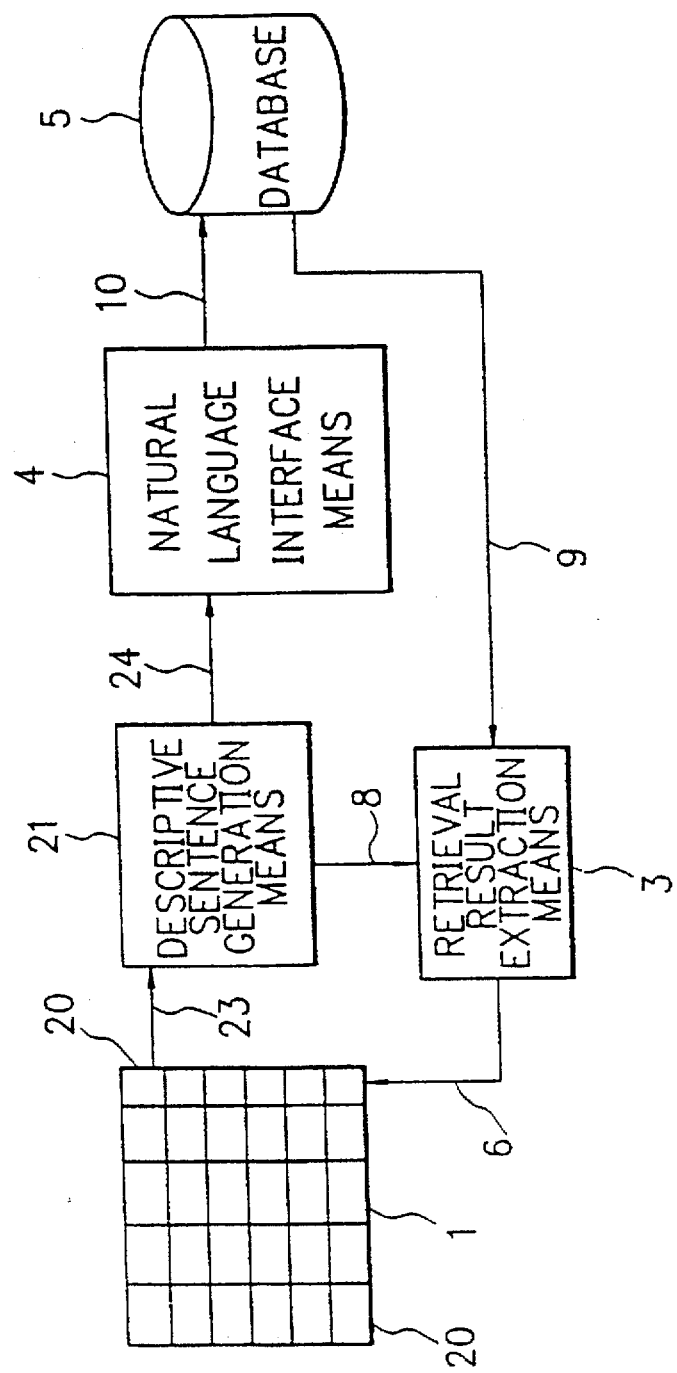
FIG. 11 is a functional block diagram of a data retrieving device in the second embodiment.

FIG. 11 is a functional block diagram of a data retrieving device according to a second embodiment of the invention. As apparent from comparison between FIGS. 1 and 11, the data retrieving device according to the second embodiment is constituted with a plurality of components having like or similar functions to the first embodiment, though being different therefrom in their arrangement and order of process steps. The second embodiment will be described below mainly about the difference to the first embodiment, with reference to FIG. 11.

The data retrieving device according to the second embodiment comprises a table means 1 formatted with at least one title section 20, a descriptive sentence generation means 21, a retrieval result extraction means 8, a natural language interface means 4, and a database 5.

The data retrieving device according to the present embodiment is characterized by respective connections between table means 1 and descriptive sentence generation means 21 and between generation means 21 and natural language interface means 4.

Title section 20 provided in table means 1 may have an arbitrary form such as a straight one ruled for columns as in the table of FIG. 2 or for lines as in that of FIG. 3 or combination for both columns and lines as in FIG. 4, and may be arbitrarily layered for columns or lines or for both, so that a set of title names 22 may be preferably layered as in FIG. 5.

Descriptive sentence generation means 21 functions as a software, circuitry or device for having input thereto title information 23 recorded in title section 20 and output therefrom a descriptive sentence 24 for retrieving a volume of data corresponding to title information 28 on database 5. Title information 23 includes title names 22 and address information 8 of their record address. Generation means 21 outputs address information 8 in input title information 23 to retrieval result extraction means 3.

Figure 12:
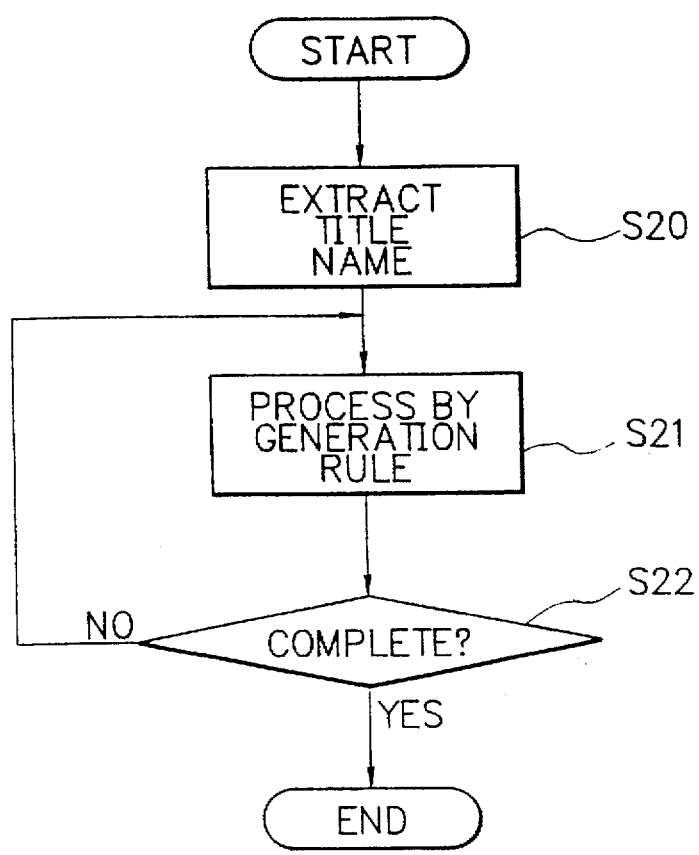
FIG. 12 is a flow chart for illustrating essential functions of a descriptive sentence generation means.

FIG. 12 shows a flow chart of essential steps in the process by descriptive sentence generation means 21. Title names 22 are extracted from title section 20 of table means 1, at a first step S20. They are processed to prepare descriptive sentence 24 according to a generation rule, at a second step S21.

FIG. 13 shows an execution procedure of the generation rule. The execution procedure is for combining title names 22 of title section 20 to prepare descriptive sentence 24. By the procedure, for example, descriptive sentence 24 of FIG. 14 is generated from FIG. 2 by combining title names 22 in title section 20 of the table, and that of FIG. 15 from FIG. 4 by combining a set of title names 22 in title section 20 for columns of the table and another set in title section 20 for rows thereof, either as a set of retrieval objects and the other as a set of retrieval conditions. In the case of a database retrieval desired for a particular region 25 in the table of FIG. 4, related title names "PROFIT" and "SECOND HALF YEAR" to region 25 are selected to prepare a sentence of FIG. 16 or the like as descriptive sentence 24. In the case title names 22 are layered as in FIG. 5, layered names are connected in series to prepare a sentence of FIG. 17 or the like as descriptive sentence 24.

As shown in FIG. 12, descriptive sentence 24 prepared by the above procedure is judged for the completeness of sentence generation at a step S22. If the judgment is negative or if the sentence generation is incomplete, the preparation process at step S21 is repeated. If the judgment is affirmative, the process of descriptive sentence generation means 21 is completed.

The total function of the data retrieving device according to the second embodiment, which comprises the components of FIG. 11, is similar to that shown in FIG. 10 for the data retrieving device according to the first embodiment, providing that the flow chart of FIG. 12 substitutes for step S10 in the flow chart of FIG. 10. Description of similar functional steps in the second embodiment to the first is thus omitted without prejudice to the subject matter.

Figure 18:
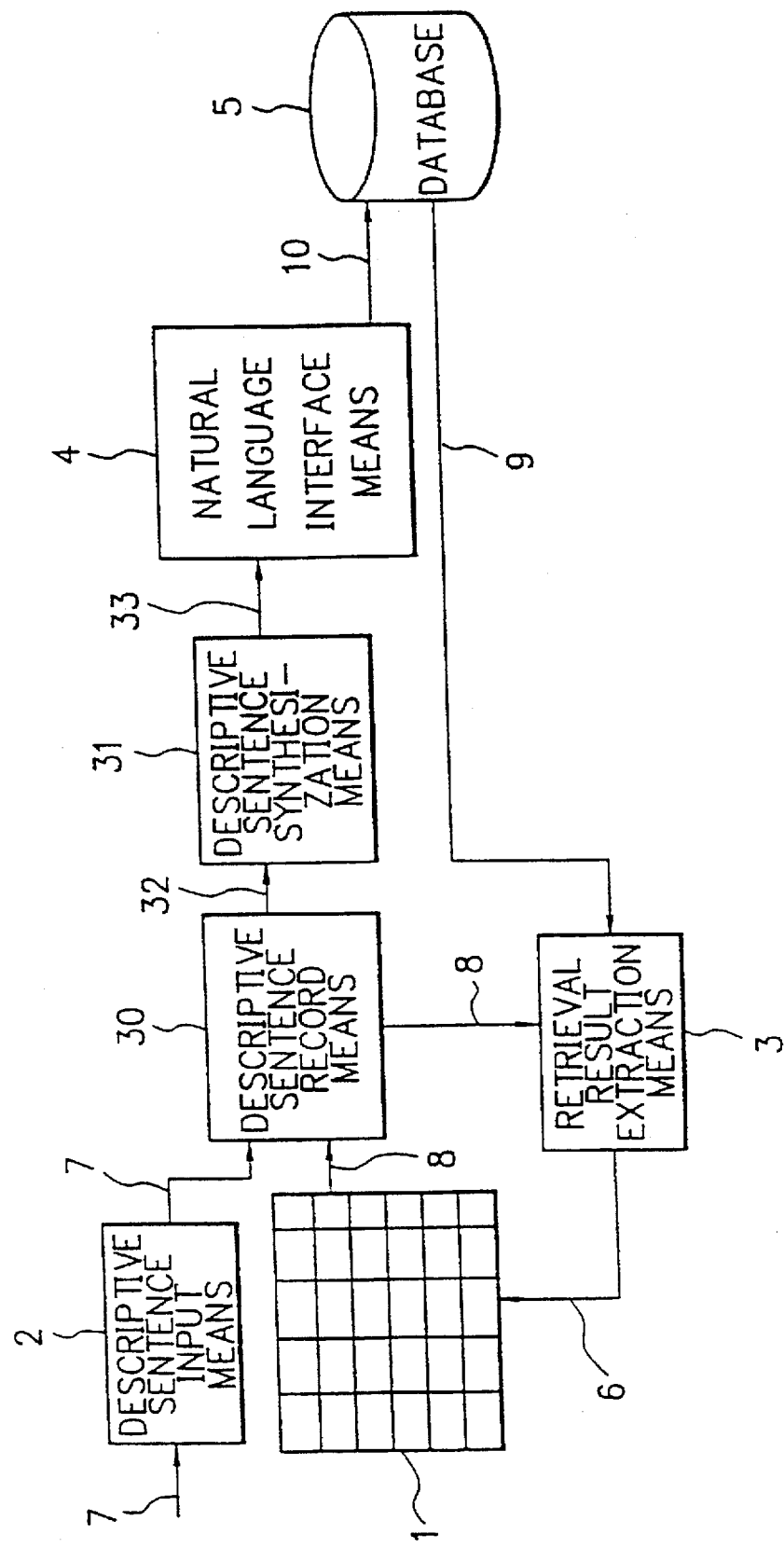
FIG. 18 is a functional block diagram of a data retrieving device in the third embodiment.

FIG. 18 is a functional block diagram of a data retrieving device according to a third embodiment of the invention, which will be described below. Description of the third embodiment will be made mainly about characteristics thereof, like that of the second.

The data retrieving device according to the third embodiment comprises a descriptive sentence record means 30, a descriptive sentence synthesization means 31 and the respective essential components of the data retrieving device according to the first embodiment.

Descriptive sentence record means 30 works to temporarily store one or more descriptive sentences 7 and address information 8, and functions as a buffer memory for a timing control relating to a process in a subsequent stage including descriptive sentence synthesization means 31. Descriptive sentences 7 to be temporarily stored in record means 30 are input by an input means 2 or may be directly or indirectly read from a table means 1. Address information 8 is read from table means 1 to record means 30 and output from record means 30 to retrieval result extraction means 3 also.

Descriptive sentence synthesization means 31 functions as a software, circuitry or device for having input thereto a plurality of recorded descriptive sentences 32 as output from descriptive sentence record means 30, combining or synthesizing input descriptive sentences 32 to generate a synthesized descriptive sentence 33, and outputting synthesized descriptive sentence 33.

Figure 19:
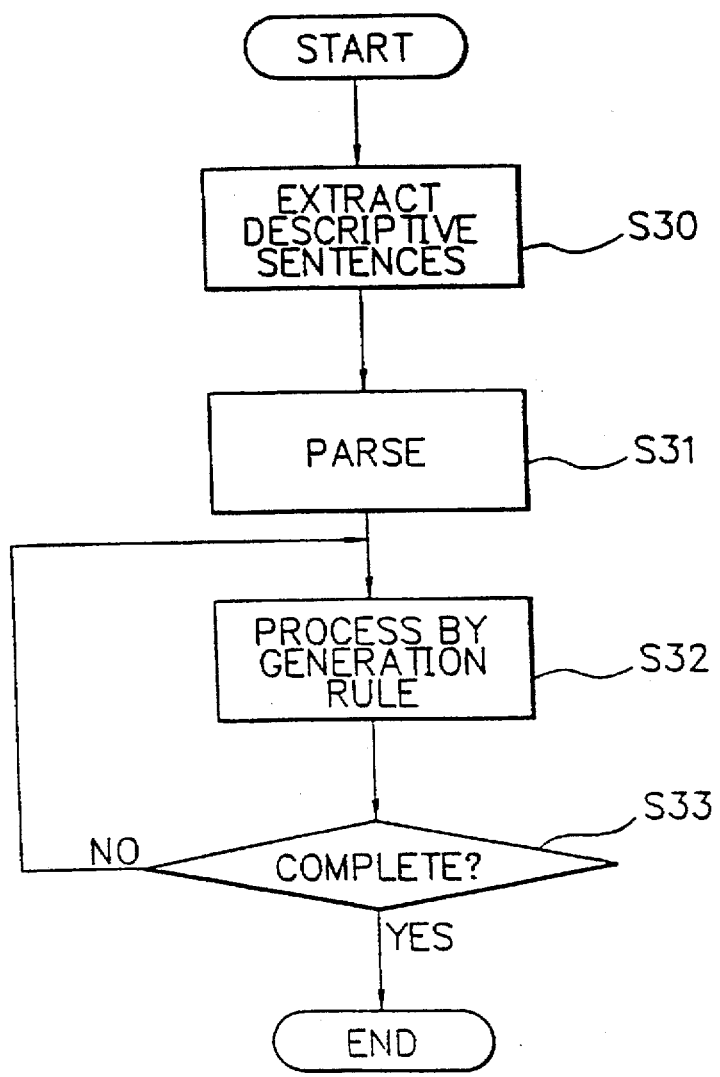
FIG. 19 is a flow chart for illustrating essential functions of a descriptive sentence synthesization means.

FIG. 19 shows a flow chart of the function of descriptive sentence synthesization means 31. Plural descriptive sentences 32 stored in descriptive sentence record means 30 are taken to be extracted or output at a step S30. Taken descriptive sentences 32 are parsed, at a step S31, into speeches grouped to be objects or conditions. The objects and conditions as parsed elements of descriptive sentences 32 are processed to prepare a synthesized descriptive sentence according to a generation rule, at a step S32. The generation rule of this step S32 is similar to that employed in step S21 of the second embodiment. Prepared descriptive sentence is judged for the completeness of generation, at a step S33. If the judgment is negative for a incomplete sentence, step S32 is repeated. In the case it is affirmative for a complete sentence, the process of descriptive sentence synthesization means 31 is completed.

The total function of the data retrieving device according to the third embodiment, which comprises the components of FIG. 18, is similar to that shown in FIG. 10 for the data retrieving device according to the first embodiment, providing that the flow chart of FIG. 19 substitutes for step S10 in the flow chart of FIG. 10. Description of similar functional steps in the third embodiment to the first is thus omitted without prejudice to the subject matter.

Figure 20:
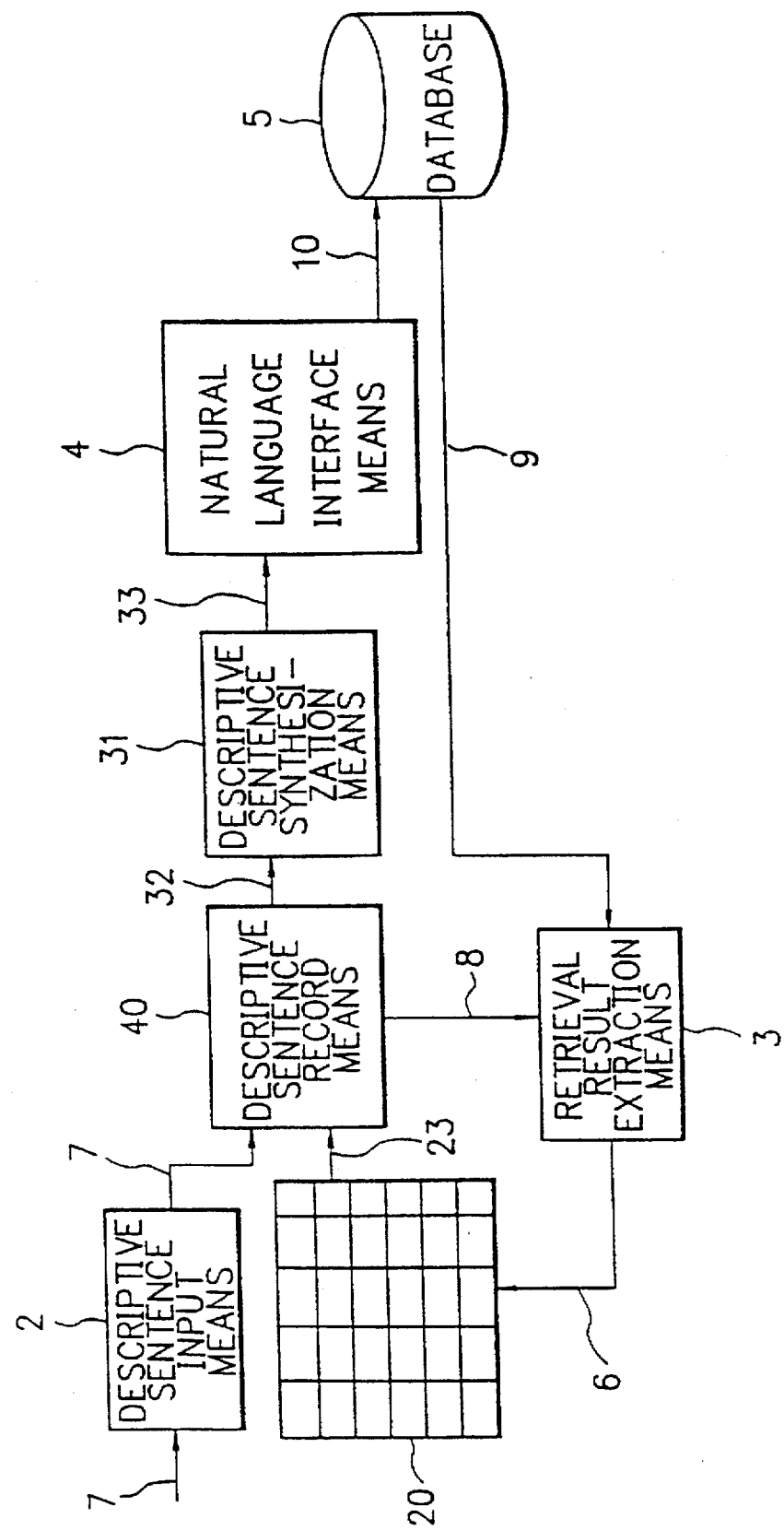
FIG. 20 is a functional block diagram of an exemplary variation of the third embodiment.

FIG. 20 shows a functional block diagram of a data retrieving device according to a variation of the third embodiment, in which a table means 1 is formatted with a title section 20. The data retrieving device of FIG. 20 includes a descriptive sentence record means 40 for recording therein a plurality of descriptive sentences 7 together with related title information 23 from table means 1. Address information 8 in title information 23 is output also to retrieval result extraction means 3. Other functions than described of the device of FIG. 20 are similar to corresponding ones in the third embodiment.

As apparent from the foregoing description of the preferred embodiments, in a data retrieving device or method according to the present invention or some aspects thereof, a descriptive sentence input through a descriptive sentence input means by a natural language or title information recorded in a table means is used to generate a retrieval formula for executing a data retrieval on a database, and the results of retrieval are recorded as table data in the table means, without the needs of conventional professional knowledge of data retrieval and registration, such as on the structure of the database or table means or for programming the retrieval formula, thus permitting the retrieval on a database and the record of retrieval results to be executed in a facilitated manner.

Although the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A data retrieving device for retrieving a set of data on a database and inputting the retrieved data to an electronic spreadsheet having a table means for recording the data in a tabulated form, comprising:

descriptive sentence input means for inputting by a natural language a descriptive sentence relating to the data to be reformed as data to be recorded in the table means;

natural language interface means for converting the input descriptive sentence into a retrieval formula for retrieving the data on the database; and retrieval result extraction means for executing the data retrieval on the database by the retrieval formula using correspondence information between the descriptive sentence and the table means to extract from the database a reformed data in a tabulated form, and recording the reformed data in the table means.

2. The data retrieving device as claimed in claim 1, wherein the table means includes a predetermined title section having one or more recorded titles corresponding to the data to be recorded in the table means, further comprising:

descriptive sentence generation means for generating a descriptive sentence relating to the data to be recorded in the table means by inputting the recorded title or titles and by combining the input titles, the descriptive sentence generated by the descriptive sentence generation means being input to the natural language interface means.

3. The data retrieving device as claimed in claim 1, further comprising:

descriptive sentence record means for recording one or more descriptive sentences corresponding to a set of data recorded in the table means; and descriptive sentence synthesization means for generating a synthetic descriptive sentence by inputting the descriptive sentence or sentences recorded in the descriptive sentence record means and by combining the input sentences, the synthetic descriptive sentence generated by the descriptive sentence synthesization means being input to the natural language interface means.

4. A data retrieving method for retrieving a set of data on a database and inputting the retrieved data to an electronic spreadsheet having a formatted table for recording the data, comprising:

a descriptive sentence acquisition step for acquiring by a natural language a descriptive sentence relating to the data to be reformed as data to be recorded in the table;

a natural language interface step for converting the acquired descriptive sentence into a retrieval formula for retrieving the data on the database; and a retrieval result extraction step for executing the retrieval on the database by the retrieval formula using correspondence information between the descriptive sentence and the table to extract from the database a reformed data in a tabulated form, and recording the reformed data in the table.

5. The data retrieving method as claimed in claim 4, wherein the descriptive sentence acquisition step comprises a descriptive sentence input step for inputting the descriptive sentence through an input means.

6. The data retrieving method as claimed in claim 4, wherein the descriptive sentence acquisition step comprises:

a title information reading step for reading title information recorded in a title section provided in the table; and a descriptive sentence generation step for generating a descriptive sentence relating to the data from the read title information.

7. The data retrieving method as claimed in claim 4, wherein the title information comprises a title name, and address information concerning the record address of the title name.

8. The data retrieving method as claimed in claim 4, wherein the descriptive sentence acquisition step comprises:

a descriptive sentence record step for temporarily storing a plurality of descriptive sentences; and a descriptive sentence synthesization step for reading the stored descriptive sentences and synthesizing them to generate a single descriptive sentence.

9. The data retrieving method as claimed in claim 8, wherein the descriptive sentence record process step includes an input step for inputting the descriptive sentences by an input means.

10. The data retrieving method as claimed in claim 8, wherein the descriptive sentence record step includes a reading step for reading a set of title names as the descriptive sentences from the title section of the table.

11. The data retrieving method as claimed in claim 4, wherein the descriptive sentence acquisition step comprises steps of:

a descriptive sentence input step for inputting the descriptive sentence through an input means;

a title information reading step for reading title information recorded in a title section provided in the table; and a descriptive sentence generation step for generating a second descriptive sentence relating to the data from the read title information.

12. The data retrieving method as claimed in claim 11, wherein the retrieval result extraction step comprises retrieving data on said database satisfying both said descriptive sentence and said second descriptive sentence.

13. A data retrieving device for retrieving a set of data on a database and inputting the retrieved data to an electronic spreadsheet having a table means for recording the data in a tabulated form, comprising:

natural language interface means for converting an input descriptive sentence into a retrieval formula for retrieving the data on the database; and retrieval result extraction means for executing the data retrieval on the database by the retrieval formula using correspondence information between the descriptive sentence and the table means to extract from the database a reformed data in the tabulated form, and recording the reformed data in the table means, wherein the table means includes a predetermined title section having one or more recorded titles corresponding to the data to be recorded in the table means, further comprising:

descriptive sentence generation means for generating a descriptive sentence relating to the data to be recorded in the table means by inputting the recorded title or titles and by combining the input titles, the descriptive sentence generated by the descriptive sentence generation means being input to the natural language interface means.

14. The data retrieving device as claimed in claim 13, wherein said natural language interface means further comprises a comparing means for comparing said input descriptive sentence and said descriptive sentence, said retrieval formula comprising information satisfying both said input descriptive sentence and said descriptive sentence.

* * * * *